Aug. 26, 1930.  R. S SANFORD  1,774,158

SERVO BRAKE

Filed April 16. 1927

INVENTOR.
Roy S. Sanford
BY
Burton & McConkey
ATTORNEYS

Patented Aug. 26, 1930

1,774,158

UNITED STATES PATENT OFFICE

ROY S. SANFORD, OF SOUTH BEND, INDIANA, ASSIGNOR TO BENDIX BRAKE COMPANY, OF CHICAGO, ILLINOIS, A CORPORATION OF ILLINOIS

SERVO BRAKE

Application filed April 16, 1927. Serial No. 184,293.

My invention relates to an improved servo brake. The object is to provide in a vehicle having a power plant to drive it and brake mechanism to retard its travel, a servo device associated with the brake mechanism and directly coupled with the power plant to be actuated thereby.

My invention is here illustrated as embodied in servo brake mechanism on an automobile having brakes associated with its wheels and an engine connected therewith through a clutch to drive the same, which servo mechanism is so constructed and arranged as to be controlled by the control member provided for the clutch whereby, following the actuation of such control member to release the clutch the servo mechanism is brought into action to apply the brakes.

Servo devices have heretofore been employed wherein a connection was made with certain moving parts of the vehicle to take a power impulse therefrom to apply the brakes but in these cases the servo device received its impulse due to the inertia of travel of the vehicle. In such a construction the applied braking force decreased as the vehicle was retarded. In the construction here shown the application of the servo is entirely independent of the rate of travel of the vehicle and depends rather upon the speed of the engine and is directly controlled thereby. The vehicle, therefore, might be rapidly decreasing in speed and yet the servo device might be constantly bringing a greater retarding force to bear upon the vehicle.

Other advantageous features and meritorious objects of my invention will more fully appear from the following description, appended claims, and accompanying drawing, wherein:

Figure 1:
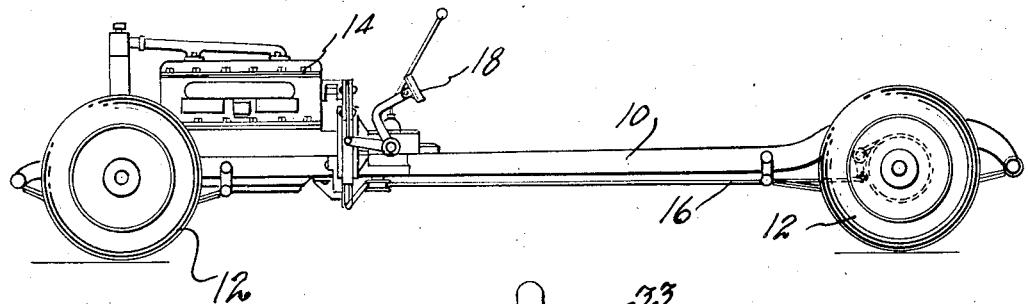
Fig. 1 is a side elevation of an automobile chassis including my invention.
Figure 2:
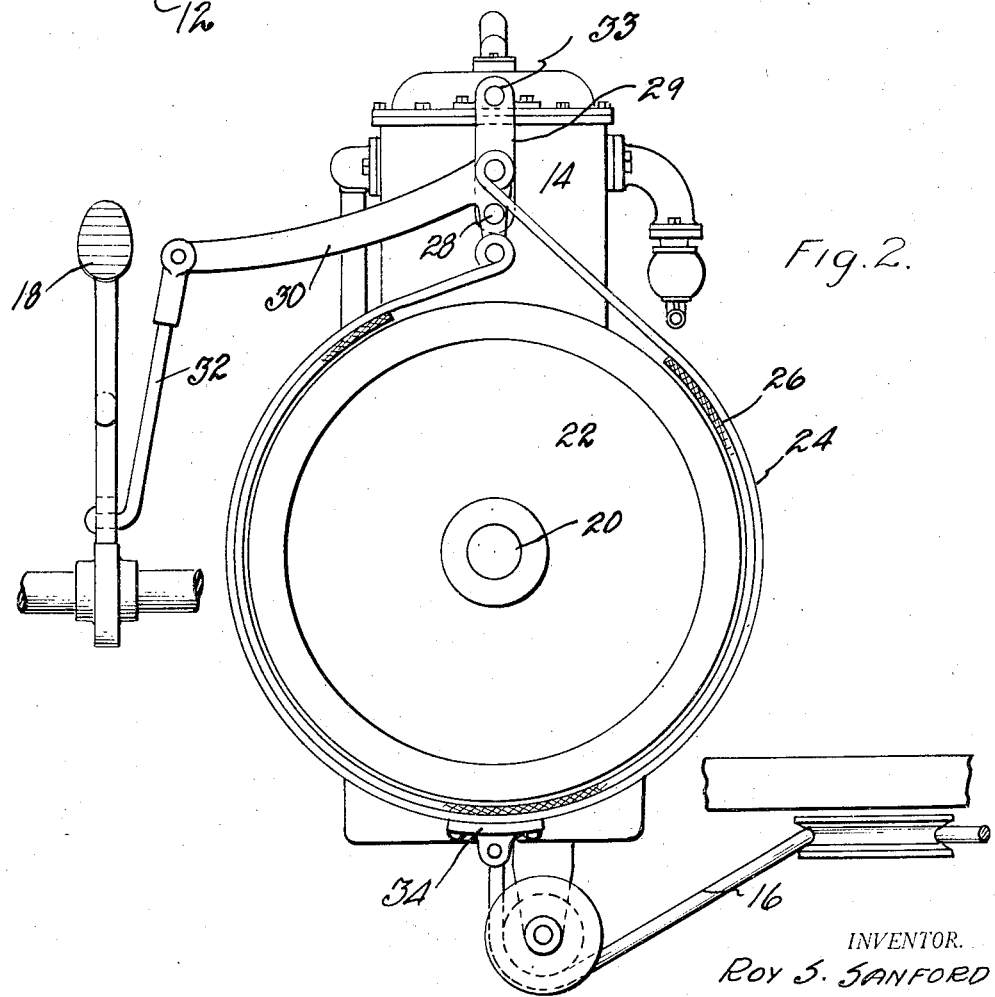
Fig. 2 is a rear elevation of the engine provided with my improved servo device.

In the embodiment of the invention illustrated in the drawing, let 10 indicate a road vehicle having wheels 12 and an engine 14. These road wheels are provided with brakes and an operating connection 16 leads thereto. The driving connection between the engine and the vehicle includes a clutch which is controlled by the clutch pedal 18. The engine shaft 20 carries a rotatable element, which may be the flywheel 22, and a band 24, provided with a friction face 26, encircles this wheel. Opposite ends of the band are connected on opposite sides of a pivotal mounting 28 to the short arm of a bellcrank lever 30, the long arm of which is articulated through a link 32 with the clutch pedal 18 to be actuated thereby to tighten the band about the wheel upon depression of the clutch pedal. The pivot 28 is a floating one as it supports the bellcrank lever on the swinging link 29 which link is pivotally supported at 33.

A bracket 34 is secured to the band 24 and the brake connection 16 is secured to the bracket 34 whereby, upon actuation of the band as it is actuated by the wheel when tightened thereabout, the brakes are applied.

The connection between the clutch pedal and the band 24 is such that the initial movement of the clutch pedal releases the clutch, disconnecting the engine from driving engagement with the vehicle, and continued movement of the clutch pedal tightens the band about the fly-wheel and applies the brakes. It is therefore evident that an operator driving the vehicle may keep his right foot on the accelerator and with the left release the clutch and apply the brakes and, if necessary, speed up the engine to obtain the maximum braking force.

What I claim is:

1. A vehicle having, in combination, wheels, brakes therefor, an engine detachably coupled with the wheels to drive the vehicle, and a servo device including a rotatable element coupled with the engine to be rotated thereby irrespective of whether the engine is coupled for driving with the wheels and a band encircling said rotatable element and connected with the brakes, said band adapted to be tightened about said rotatable element to be actuated thereby to apply the brakes.

2. A vehicle having, in combination, wheels, brakes therefor, an engine to drive the vehicle, a clutch in the driving connection with the engine, a clutch pedal, a servo device connected with the brakes to apply the brakes, said servo device having one part coupled with the engine to be driven thereby at all times during the running of the engine, and having another part coupled with the clutch pedal to be actuated thereby to engage the part under control of the engine to apply the brakes but only after the clutch pedal has been actuated sufficiently to release the clutch.

3. A vehicle having, in combination, wheels, brakes therefor, an engine to drive the vehicle, a clutch in the driving connection with the engine, a servo device connected with the brakes and mechanically coupled with the engine to be actuated thereby to apply the brakes, and a single control member for the clutch and for the servo device.

4. A vehicle having, in combination, wheels, brakes therefor, an engine having a fly-wheel, a servo device connected with the brakes and including a band encircling the fly-wheel to be tightened thereabout to apply the brakes.

5. A vehicle having, in combination, wheels, brakes therefor, an engine having a drive-shaft connected through a clutch with the vehicle to drive the vehicle, a fly-wheel on the shaft, a band about the fly-wheel, said band connected with the brakes to apply them, and a clutch pedal for controlling the clutch; said clutch pedal connected with the band to tighten the band about the fly-wheel to apply the brakes.

6. A vehicle having wheels, brakes for the wheels, an engine connected with the wheels to propel the vehicle, a clutch in the driving connection between the engine and the wheels, a servo device connected with the brakes and mechanically coupled with the engine to be actuated thereby to apply braking pressure, and means connecting the clutch with the servo device whereby the servo device operates to apply the brakes upon release of the clutch.

7. A vehicle having wheels, brakes for the wheels, an engine connected through a clutch with the wheels to propel the vehicle, a servo device connected with the brakes and the engine to derive brake applying power from the engine, clutch operating mechanism, said servo device having one part connected with the engine to be driven constantly thereby during the running of the engine, and a second part connected with the clutch operating mechanism to be actuated thereby during the disengagement of the clutch to be coupled with the first part to be actuated thereby to apply the brakes.

8. A vehicle having wheels, brakes for the wheels, an engine connected through a clutch with the wheels to propel the vehicle, a servo device connected with the brakes and the engine to derive brake applying power from the engine, clutch operating mechanism, said servo device having one part mechanically coupled with the engine to be driven thereby during the running thereof and a second part coupled with the brakes to apply the brakes and with the clutch operating mechanism to be actuated thereby following a limited initial movement of the clutch, to engage the first part to be actuated thereby to apply the brakes.

9. A vehicle having wheels, brakes for the wheels, an engine connected with the wheels to propel the vehicle, said engine having a fly-wheel, a servo device connected with the brakes and coupled with the fly-wheel to receive brake applying power therefrom and means operable to bring the servo device into engagement with the fly-wheel to derive power from the fly-wheel and to disengage the same therefrom.

10. A vehicle having an engine to propel it and brakes to retard its travel, said engine having a fly-wheel, and means operable to couple the brakes with the periphery of the fly-wheel to receive brake applying power therefrom.

11. A vehicle having wheels, brakes for the wheels, an engine, means operable to releasably couple the engine with the wheels to propel the vehicle, and mechanism coordinated with said means to releasably couple the engine with the brakes to deliver brake applying power thereto coincident with the disengagement of the driving connection between the engine and the wheels.

12. A vehicle having wheels, brakes for the wheels, an engine connected with the wheels through a clutch to propel the vehicle, a servo device connected with the brakes to exert brake applying force thereon, and a single control member to bring the clutch and servo device jointly into operation, said servo device having one part mechanically connected with the engine to be constantly rotatably driven thereby during the running of the engine, and a second part connected with the brakes and with the single control member to be actuated thereby upon disengagement of the clutch to derive power from the first part to apply the brakes.

13. A vehicle having wheels, brakes for the wheels, an engine connected with the wheels through a clutch to propel the vehicle, a servo device connected with the brakes to exert brake applying force thereon, and control means operable to disengage the clutch and, upon the disengagement thereof to bring the servo device into operation to apply the brakes, said servo device having one part mechanically connected with the engine on the engine side of the clutch to be constantly rotatably driven thereby during the running of the engine, and a second part connected with the brakes and with the single control member to be actuated thereby upon disengagement of the clutch to derive power from the first part to apply the brakes.

In testimony whereof, I, ROY S. SANFORD, sign this specification.

ROY S. SANFORD.